(12) United States Patent
Fukushima

(10) Patent No.: US 9,313,345 B2
(45) Date of Patent: Apr. 12, 2016

(54) INFORMATION PROCESSING APPARATUS, SYSTEM, AND CONTROL METHOD FOR INFORMATION PROCESSING APPARATUS

(71) Applicant: CANON KABUSHIKI KAISHA, Tokyo (JP)

(72) Inventor: Kenta Fukushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/555,278

(22) Filed: Nov. 26, 2014

(65) Prior Publication Data

US 2015/0156349 A1 Jun. 4, 2015

(30) Foreign Application Priority Data

Nov. 29, 2013 (JP) ................................ 2013-248206

(51) Int. Cl.
*H04N 1/00* (2006.01)
(52) U.S. Cl.
CPC ......... *H04N 1/00344* (2013.01); *H04N 1/0001* (2013.01); *H04N 1/00029* (2013.01); *H04N 1/00061* (2013.01); *H04N 1/00079* (2013.01); *H04N 1/00114* (2013.01); *H04N 1/00244* (2013.01)

(58) Field of Classification Search
USPC .......................................................... 358/1.15
See application file for complete search history.

(56) References Cited

U.S. PATENT DOCUMENTS

2004/0139188 A1* 7/2004 Imai .............................. 709/223
2014/0258468 A1* 9/2014 Ishino .......................... 709/219

FOREIGN PATENT DOCUMENTS

JP 2013-29922 A 2/2013

* cited by examiner

*Primary Examiner* — Ngon Nguyen
(74) *Attorney, Agent, or Firm* — Canon USA, Inc., IP Division

(57) ABSTRACT

An HTTP relay server determines whether a communication partner device is a supporting device or a supported device, using a device management table. Further, the HTTP relay server determines a state of a state (used or unused) of a URI indicating an area where support data are temporarily stored, and a device using the URI (device ID), using the URI management table. When access (communication request) is received from an image forming apparatus, the HTTP relay server assigns the image forming apparatus to an unused URI. Further, when access (communication request) is received from an operator PC, the HTTP relay server assigns the operator PC to an URI used by the supported device.

14 Claims, 14 Drawing Sheets

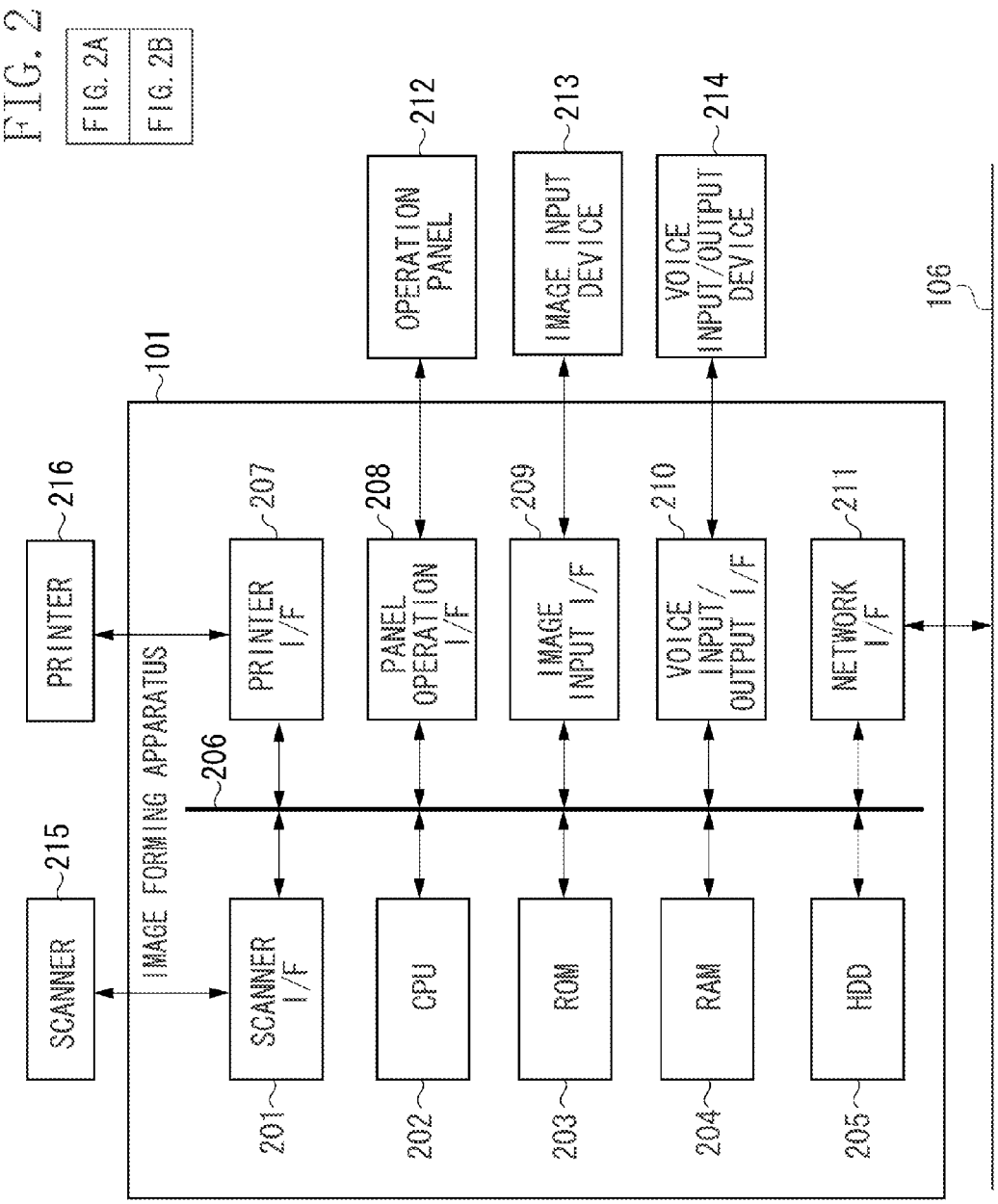

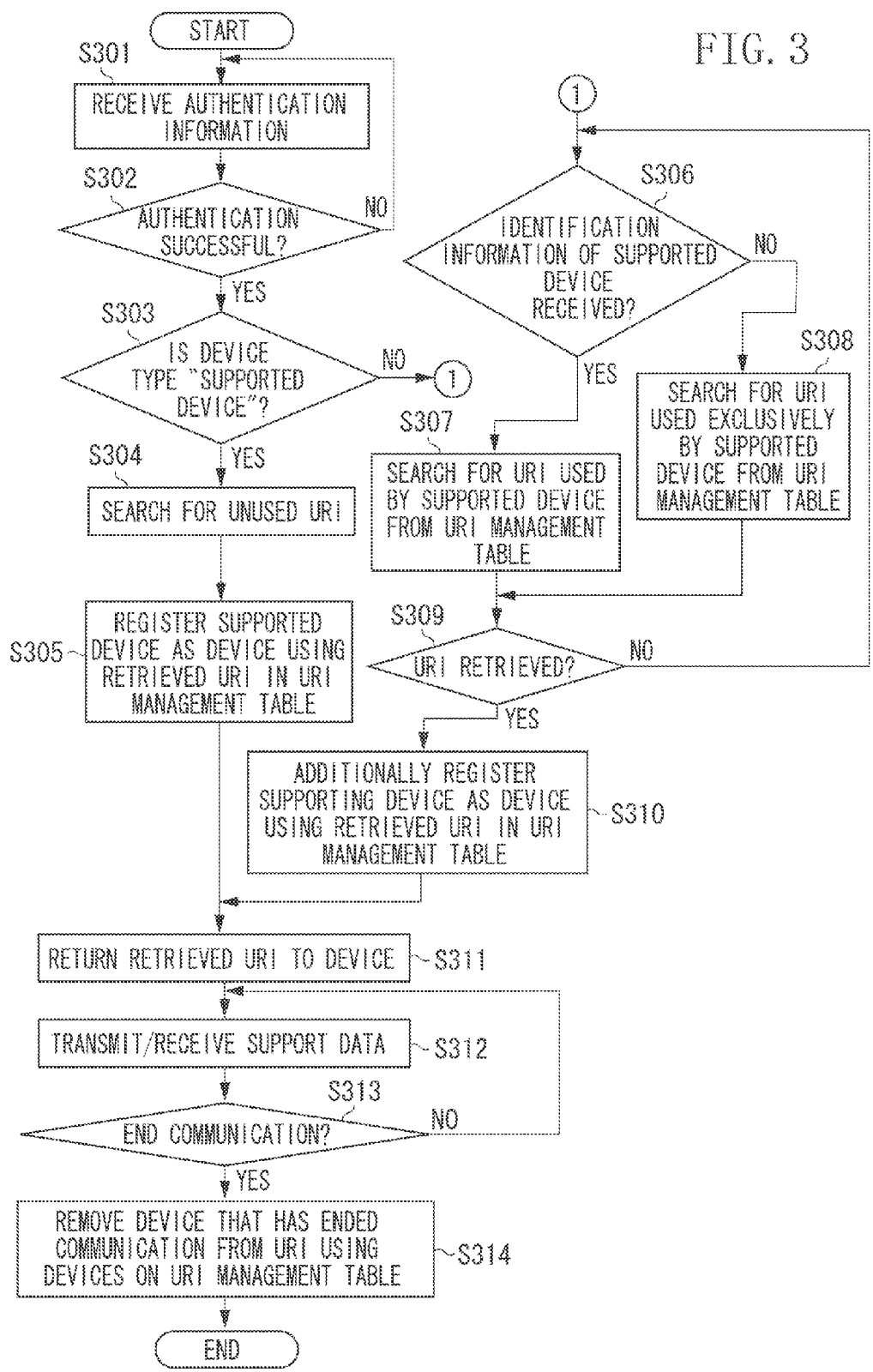

FIG. 4

| DEVICE ID | DEVICE TYPE |
|---|---|
| DEVICE A | SUPPORTED DEVICE |
| DEVICE B | SUPPORTING DEVICE |
| DEVICE C | SUPPORTING DEVICE |
| DEVICE D | SUPPORTED DEVICE |
| ... | ... |

FIG. 5

| URI | STATE | DEVICE USING URI |
|---|---|---|
| https://support.co.jp/session101 | UNUSED | |
| https://support.co.jp/session102 | USED | DEVICE C, DEVICE D |
| https://support.co.jp/session103 | UNUSED | |
| https://support.co.jp/session104 | USED | DEVICE E |
| ... | ... | ... |

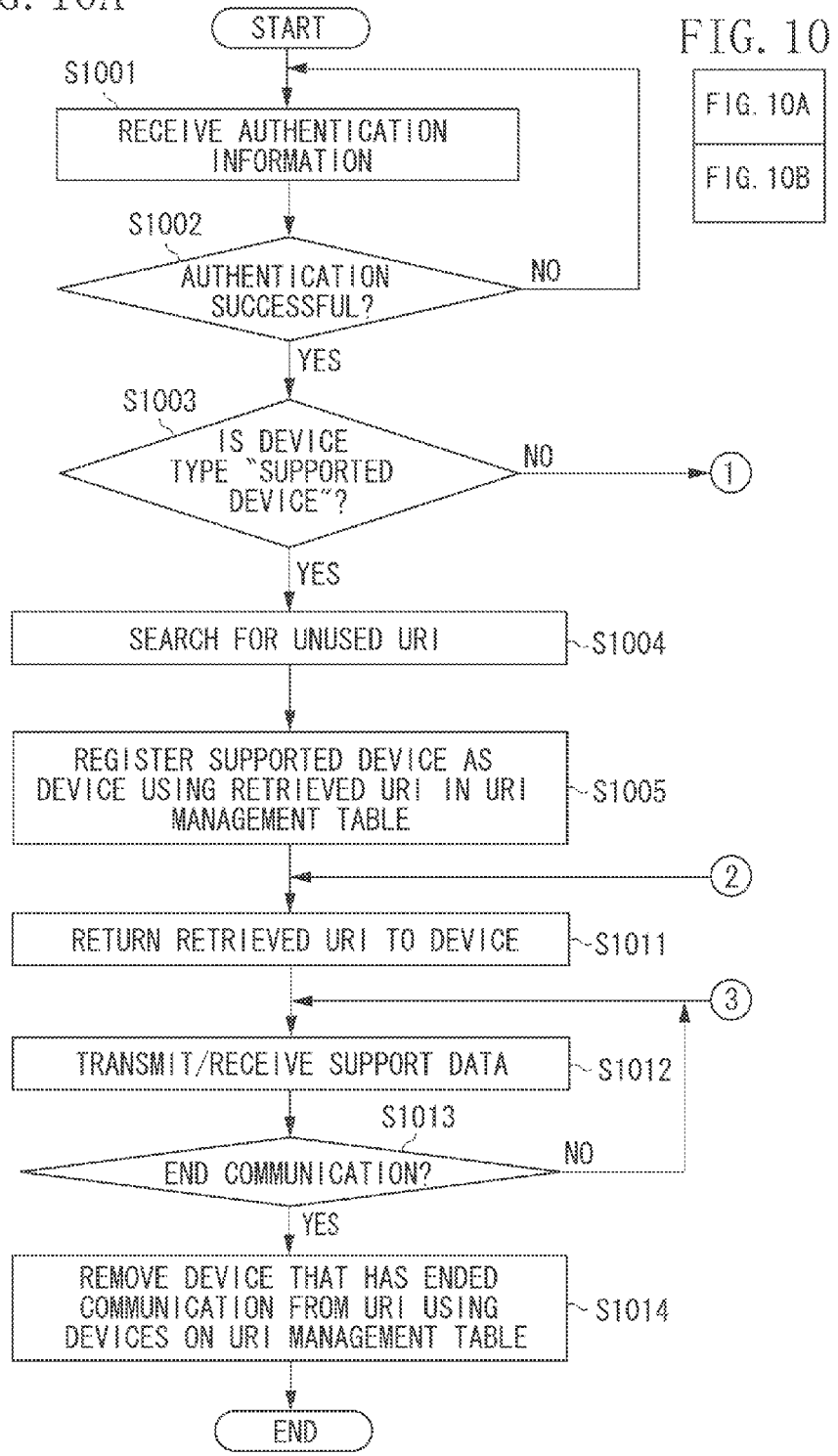

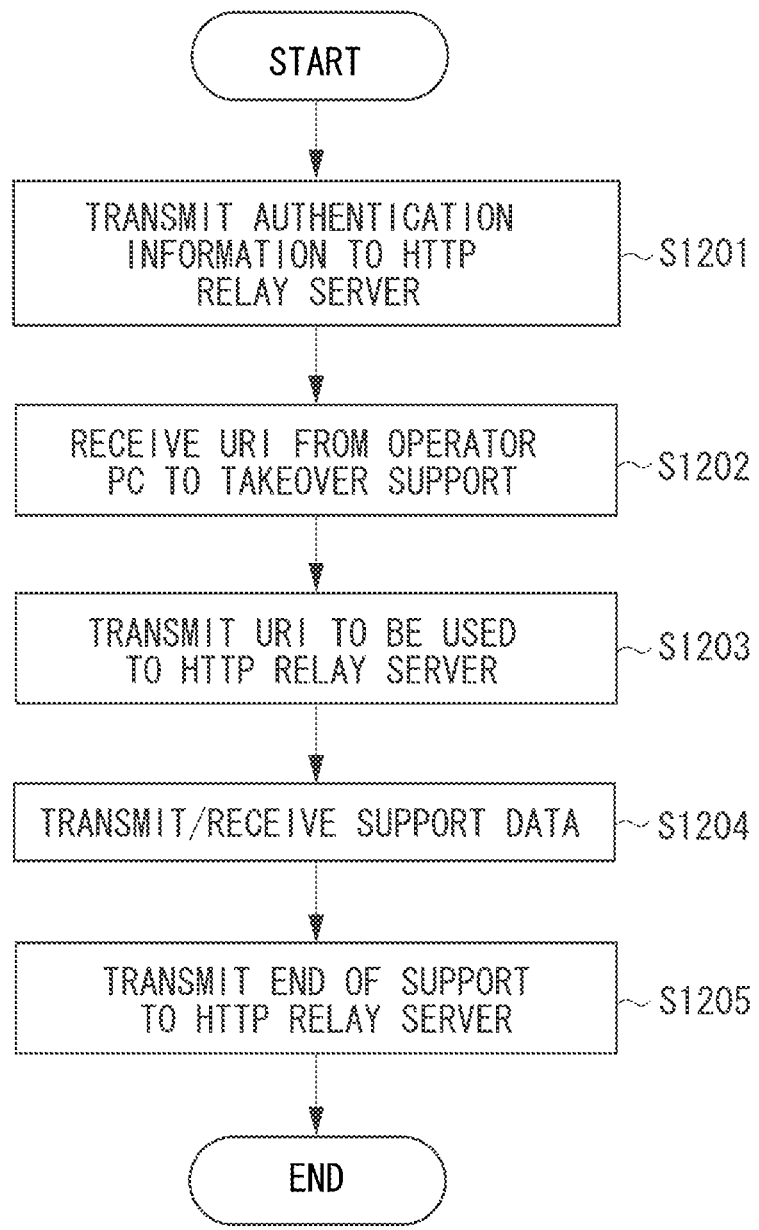

INFORMATION PROCESSING APPARATUS, SYSTEM, AND CONTROL METHOD FOR INFORMATION PROCESSING APPARATUS

BACKGROUND OF THE INVENTION

1. Field of the Invention

The present invention relates to an information processing apparatus, system, and control method therefor, and particularly suitably used in transmission/reception of data for remote support via a network between a supporting device and a supported device.

2. Description of the Related Art

As the ways of using products and measures to handle troubles become more complicated, users more often ask questions directly to call centers of manufacturers to obtain answers. In order to appropriately and promptly handle troubles, a remote support system is proposed that includes an image forming apparatus and a fault management server of a call center that manages error information of the image forming apparatus. In such a remote support system, an image forming apparatus to be supported, and an information processing apparatus of a call center that supports the image forming apparatus are often inside fire walls of their companies, respectively. Therefore, in order to allow an image forming apparatus and an information processing apparatus to communicate for the purpose of remote support or the like, it has been proposed that a relay server for relaying communication between these apparatuses is provided in the Internet (Japanese Patent Application Laid-Open No. 2013-29922). Providing such a relay server enables communication between apparatuses inside respective fire walls.

In the prior art, however, after an authentication of an image forming apparatus for receiving remote support is performed by a relay server, a user of the image forming apparatus has to perform an operation for selecting an area (for receiving support) in the relay server (for example, an operation for selecting a link on a Web screen). This makes operations by the user of the image forming apparatus complicated. Further, an information processing apparatus of a call center has to search for a device to support. Therefore, this also makes the operations by the operator of the information processing apparatus complicated.

SUMMARY OF THE INVENTION

The present invention is directed to a technique capable of allowing an easy operation when a supporting device and a supported device starts communication for remote support via a relay server.

According to an aspect of the present invention, an information processing apparatus configured to relay data transmitted/received via a network between a supporting device and a supported device that receives remote support by the supporting device, includes a storage unit configured to store each of a plurality of areas for temporarily storing data received from the supporting device and the supported device, and at least either of the supporting device and the supported device as a device using the area, in an associated state with each other, and an associating unit configured to, in a case where either the supporting device or the supported device that uses neither of the plurality of areas makes access to the information processing apparatus, automatically associate, with the area, the supporting device or the supported device that makes access, wherein the associating unit associates the supporting device or the supported device that makes access with the area in such a manner that a plurality of supporting devices that do not jointly execute the remote support are not associated with a same one of the areas, and a plurality of supported devices that do not receive identical remote support are not associated with a same one of the areas.

Further features of the present invention will become apparent from the following description of exemplary embodiments with reference to the attached drawings.

BRIEF DESCRIPTION OF THE DRAWINGS

FIG. 3 is a flowchart illustrating a HyperText Transfer Protocol (HTTP) relay server according to the first exemplary embodiment of the present invention.

FIG. 4 illustrates a device management table.

FIG. 5 illustrates a URI management table.

FIG. 12 is a flowchart illustrating processing performed by an operator PC according to a third exemplary embodiment of the present invention.

DESCRIPTION OF THE EMBODIMENTS

Various exemplary embodiments, features, and aspects of the invention will be described in detail below with reference to the drawings.

First, t a first exemplary embodiment is described.

Figure 1:
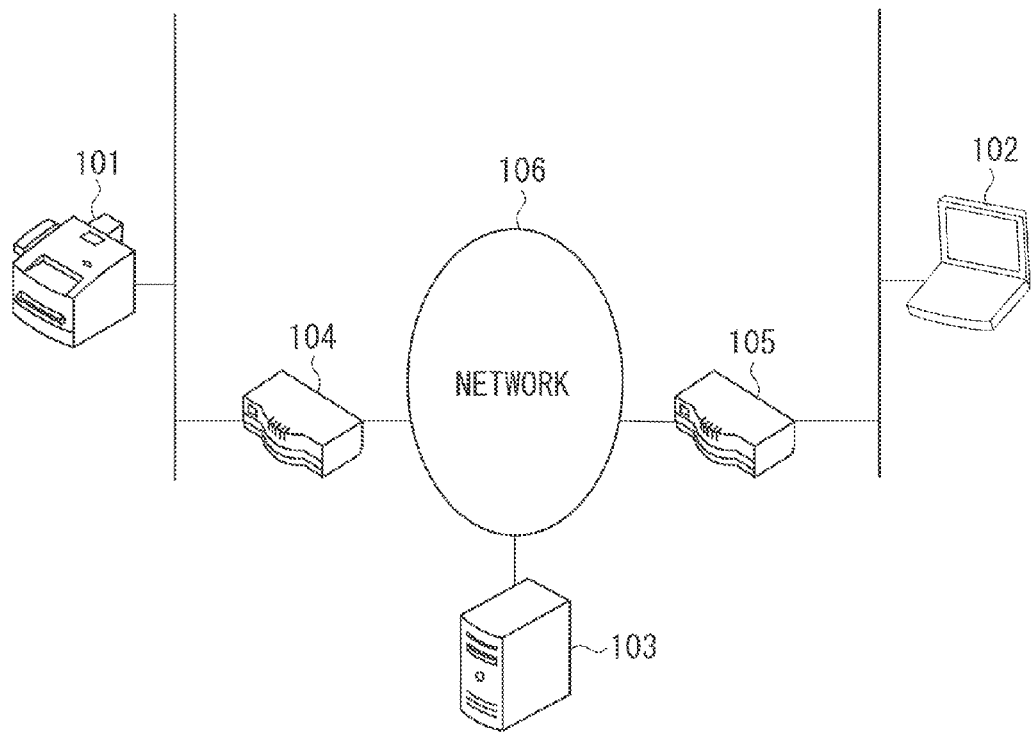
FIG. 1 is a diagram illustrating a network configuration of a remote support system according to a first exemplary embodiment of the present invention.

FIG. 1 is a diagram illustrating an example of a network configuration of a remote support system according to the present exemplary embodiment.

An image forming apparatus 101 and an operator PC 102 operate, serving as communication partners each other. Each of the image forming apparatus 101 and the operator PC 102 has a data communication function of executing call control by HyperText Transfer Protocol (HTTP) to perform data communication.

In FIG. 1, the image forming apparatus 101 is connected via a fire wall (FW) 104 to a network 106. Further, to the network 106, an operator PC 102 on a call center side is connected via a fire wall (FW) 105. Still further, an HTTP relay server 103 (information processing apparatus) is connected to the network 106. In this way, the fire walls 104 and 105 are arranged between the image forming apparatus 101 and the network 106, as well as between the operator PC 102 and the network 106, respectively, whereby defense against intrusion without permission through the network 106 can be provided.

In data communication through HTTP, client nodes execute data communication with each other by performing POST/GET to a uniform resource identifier (URI) provided by the HTTP relay server 103. This allows the client nodes to execute data communication even if the client nodes are blocked from each other by private address areas, fire walls (FW), etc.

In the present exemplary embodiment, the image forming apparatus 101 and the operator PC 102 operate as HTTP client nodes. Further, in the present exemplary embodiment, the image forming apparatus 101 and the operator PC 102 (client node) communicates with each other, via the fire walls (FW) 104 and 105 with respect to the network 106. The configuration, however, may be such that the communication between the image forming apparatus 101 and the operator PC 102 (client node) is not performed via the fire walls (FW) 104 and 105. Still further, more fire walls (FW), image forming apparatuses, and operator PCs than those illustrated in FIG. 1 may be connected to the network 106. Still further, the communication protocol may not be HTTP.

Figure 2B:
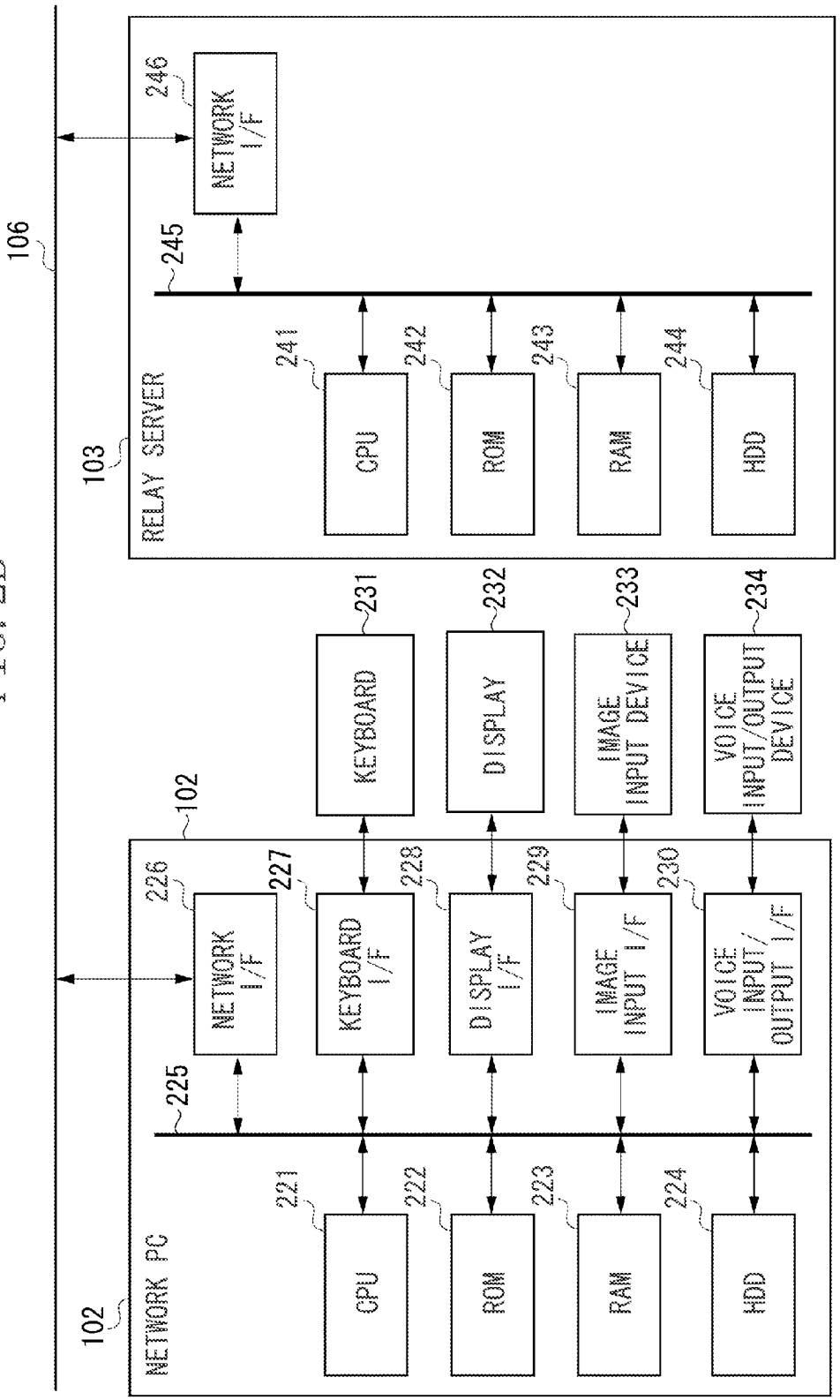
FIG. 2 (consisting of FIGS. 2A and 2B) is a diagram illustrating a hardware configuration of the remote support system.

FIG. 2 is a block diagram illustrating an example of a hardware configuration of a remote support system according to the present exemplary embodiment.

First, an example hardware configuration of the image forming apparatus 101 will be described.

A central processing unit (CPU) 202 collectively controls accesses to various types of devices connected to a system bus 206 based on a control program stored in a read-only memory (ROM) 203 or a hard disk (HDD) 205. The ROM 203 stores control programs and the like that can be executed by the CPU 202. A random access memory (RAM) 204 mainly functions as a main memory, a work area, and the like for the CPU 202, and is configured so as to allow memory capacity thereof to be extended by an optional RAM connected to an extension port (not illustrated). The hard disk drive (HDD) 205 stores a boot program, various types of applications, font data, a user file, an edition file, and the like. Though the HDD 205 is used in the present exemplary embodiment, a secure digital (SD) card, a flash memory, or the like may be used as an external storage device, other than the HDD 205. A scanner interface (I/F) 201 controls input of image data from a scanner 215. A printer I/F 207 controls output of image data to a printer 216. A panel operation I/F 208 controls display on an operation panel 212, and input of various types of setting information set on the operation panel 212. An image input I/F 209 controls input of image data from an image input device 213 such as a camera. A voice input/output I/F 210 controls input/output of voice data from/to a voice input/output device 214 such as a headset. A network I/F 211 performs data communication via a network cable with the external network 106.

Next, an example of a hardware configuration of the operator PC 102 will be described.

A CPU 221 collectively controls accesses to various types of devices connected to a system bus 225 based on a control program stored in a ROM 222 or a hard disk drive (HDD) 224. The ROM 222 stores control programs and the like that can be executed by the CPU 221. A RAM 223 mainly functions as a main memory, a work area, and the like for the CPU 221, and is configured so as to allow memory capacity thereof to be extended by an optional RAM connected to an extension port (not illustrated). The HDD 224 stores a boot program, various types of applications, font data, a user file, an edition file, and the like. Though the HDD 224 is used in the present exemplary embodiment, a SD card, a flash memory, or the like may be used as an external storage device, other than the HDD 205. A network I/F 226 performs data communication via a network cable with the external network 106. A keyboard I/F 227 controls key input from a keyboard 231, a pointing device (not illustrated), or the like. A display I/F 228 controls display on a display 232. An image input I/F 229 controls input of image data from an image input device 233 such as a camera. A voice input/output I/F 230 controls input/output of voice data from/to a voice input/output device 234 such as a headset.

Next, an example of a hardware configuration of the HTTP relay server 103 will be described.

A CPU 241 collectively controls accesses to various types of devices connected to a system bus 245 based on a control program stored in a ROM 242 or a hard disk (HDD) 244. The ROM 242 stores control programs and the like that can be executed by the CPU 241. A RAM 243 mainly functions as a main memory, a work area, and the like for the CPU 241, and is configured so as to allow memory capacity thereof to be extended by an optional RAM connected to an extension port (not illustrated). The HDD 244 stores a boot program, various types of applications, font data, a user file, an edition file, and the like. Though the HDD 244 is used in the present exemplary embodiment, a SD card, a flash memory, or the like may be used as an external storage device, other than the HDD 244. A network I/F 246 performs data communication via a network cable with the external network 106.

FIG. 3 is a flowchart illustrating an example of processing performed by the HTTP relay server 103 when the communication by the HTTP relay server 103 is performed with the image forming apparatus 101 and operator PC 102. The flowchart illustrated in FIG. 3 is achieved when, for example, the CPU 241 reads out a program stored in the HDD 244 into the RAM 243 and executes the read program.

First, in step S301, the HTTP relay server 103 receives authentication information via the network I/F 246 from the image forming apparatus 101, or the operator PC 102. In the present exemplary embodiment, an example case is described where the authentication information is an identification (ID) assigned to each device (device ID). The authentication information, however, is not limited to this. The authentication information may be, for example, a user ID.

Next, in step S302, the HTTP relay server 103 performs authentication according to authentication information received in step S301, and determines whether authentication is successfully executed. If the HTTP relay server 103 determines that the authentication is successful (YES in step S302), the processing proceeds to step S303. On the other hand, if the authentication fails (NO in step S302), the processing returns to step S301.

If the authentication is successful (YES in step S302) and the processing proceeds to step S303, then, the HTTP relay server 103 determines the type of the communication partner that has been authenticated. For example, a table in which device IDs and types of the devices of the device IDs are registered in a state of being mutually associated with each other may be stored previously in the HDD 244, and the device type associated to the device ID received in step S301 may be extracted, whereby the type of the communication partner can be specified.

FIG. 4 illustrates an example device management table in which device IDs and device types of the device IDs are registered in a state of being mutually associated with each other.

In the present exemplary embodiment, the HTTP relay server 103 uses such a device management table to determine whether the communication partner is a "supported device"

or a "supporting device". In the present exemplary embodiment, the image forming apparatus 101 is a supported device, and the operator PC 102 is a supporting device.

In step S303, if the communication partner is determined to be a supported device (YES in step S303), the processing proceeds to step S304. If the communication partner is determined to be a supporting device (NO in step S303), the processing proceeds to step S306.

In step S304, the HTTP relay server 103 searches a URI management table stored previously in the HDD 244 for a URI that is currently in an "unused" state.

FIG. 5 illustrates an example of a URI management table. In the URI management table illustrated in FIG. 5, URIs, states thereof (whether the URIs are being "used" or "unused"), and devices using URI (information identifying the devices using the URIs) are mutually associated and registered.

The HTTP relay server 103 buffers, in the RAM 243, data posted by the image forming apparatus 101 or the operator PC 102 to a specific URI. On the other hand, when the image forming apparatus 101 or the operator PC 102 issues a request (GET) for obtaining data of a specific URI, the HTTP relay server 103 returns the data buffered in the RAM 243 to the image forming apparatus 101 or the operator PC 102. In this way, a URI is linked to an area for relaying communication on the RAM 243. In the present exemplary embodiment, the HTTP relay server 103 manages current usage states of URIs and devices currently using the URIs, in a format of the URI management table.

Returning to FIG. 3, a currently "unused"-state URI is retrieved from the URI management table as described above, and then, in step S305, the HTTP relay server 103 executes the following processing. Specifically, the HTTP relay server 103 updates the URI management table by changing the state of the URI retrieved in step S304 in the URI management table on the HDD 244 into the "used" state, and adding the communication partner device (image forming apparatus 101) as a device using URI. Then, the processing proceeds to step S311 (described below).

As described above, if the communication partner is determined to be a supporting device in step S303 (NO in step S303), the processing proceeds to step S306. In step S306, the HTTP relay server 103 determines whether an ID (device ID) of a supported device as a support target is received from the communication partner (operator PC 102). The processing in step S306 allows the support operator that operates the operator PC 102 to address both of a case of responding to support requests from an unspecified large number of devices, like a call center, for example, and a case of responding to a support request from a specific user or device.

In the case where the operator PC 102 responds to an unspecified large number of support requests, the operator PC 102 does not transmit an ID of a support target device (supported device) to the HTTP relay server 103. On the other hand, in the case where the operator PC 102 supports a specific device, the operator PC 102 transmits an ID of a support target device (supported device), for example, at a time of the first access to the HTTP relay server 103.

In step S306, if the HTTP relay server 103 received an ID of a support target device (supported device) (YES in step S306), the HTTP relay server 103 determines that the operator PC 102 responds to a support request from a specific supported device, and the processing proceeds to step S307. On the other hand, if the HTTP relay server 103 has not received an ID of a support target device (supported device) (NO in step S306), the HTTP relay server 103 determines that the operator PC 102 responds to an unspecified large number of support requests, and the processing proceeds to step S308.

In step S307, the HTTP relay server 103 searches for a URI that is in the "used" state and such that the ID of the support target device (supported device) received in step S306 is included in the IDs of the "device using URI", from the URI management table on the HDD 244.

On the other hand, in step S308, the HTTP relay server 103 searches for a URI that is in the "used" state and that all of the "devices using the URI" are supported devices, from the URI management table on the HDD 244. When the processing in step S307 or S308 ends, the processing proceeds to step S309.

In step S309, the HTTP relay server 103 determines whether a URI is retrieved in step S307 or S308. If it is determined that no URI is retrieved (NO in step S309), the processing returns to step S306. With this processing, if a support target device (the image forming apparatus 101) is not found, the processing in step S307 or S308 is executed repeatedly, whereby the registration of the operator PC 102 can be kept in a standby state until the connection from the image forming apparatus 101 is performed. This makes it possible to start communication even if the order of connection to the HTTP relay server 103 is not such that the connection from the image forming apparatus 101 is prior to the connection from the operator PC 102, but such that the connection from the operator PC 102 is prior to the connection from the image forming apparatus 101.

On the other hand, in step S309, if it is determined that a URI is retrieved (YES in step S309), the processing proceeds to step S310. In step S310, the HTTP relay server 103 performs the following processing. Specifically, the HTTP relay server 103 updates the URI management table by adding the communication partner device (operator PC 102), as a device using the URI retrieved in step S307 or S308, from URIs in the URI management table on the HDD 244.

After the processing in step S305 or S310 described above ends, the processing proceeds to step S311. In step S311, the HTTP relay server 103 returns the URI retrieved in step S304, S307 or S308 to the communication partner.

Next, in step S312, the HTTP relay server 103 relays the exchange of support data between the image forming apparatus 101 and the operator PC 102 via the URI returned in step S311. The support data is, for example, at least one type of image data (moving image or still image), voice data, and remote operation instruction data.

Next, in step S313, the HTTP relay server 103 determines whether the communication from the communication partner ends. In the present exemplary embodiment, when receiving information indicating the end of support from the communication partner, the HTTP relay server 103 determines that the communication from the communication partner ends.

In step S313, if it is determined that the communication from the communication partner has not ended (NO in step S313), the processing returns to step S312, and the HTTP relay server 103 repeatedly executes the processing in steps S312 and S313 until the communication from the communication partner ends.

When the communication from the communication partner ends (YES in step S313), the processing proceeds to step S314. In step S314, the HTTP relay server 103 performs the following processing. Specifically, the HTTP relay server 103 updates the URI management table by removing the communication partner device that has notified of the end from the URI-using devices that are associated with the URI retrieved in step S305, S307 or S308. At that time, if no device is included as the "device using URI" in the URI management table, the HTTP relay server 103 returns the state associated with the "device using URI" to the "unused" state. Then, the processing of the flowchart of FIG. 3 ends.

Figure 6:
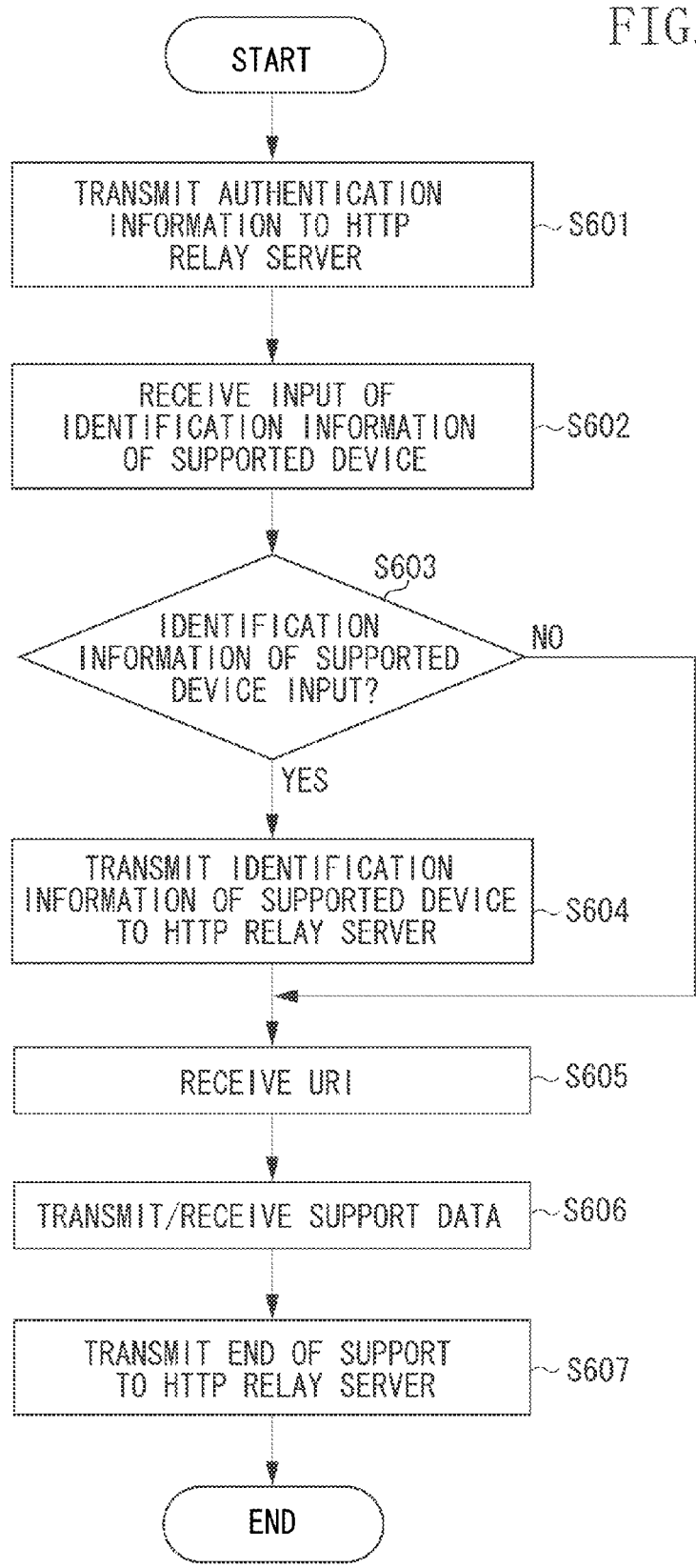
FIG. 6 is a flowchart illustrating processing performed by an operator personal computer (PC) according to the first exemplary embodiment of the present invention.

FIG. 6 is a flowchart illustrating an example of processing executed by the operator PC 102 when communication is performed with the HTTP relay server 103. The flowchart illustrated in FIG. 6 is achieved when, for example, the CPU 221 reads out a program stored in the HDD 224 into the RAM 223 and executes the program.

First, in step S601, the operator PC 102 transmits authentication information to the HTTP relay server 103. As described above, the authentication information may be a device ID, or alternatively, other information (e.g., a user ID). In the present exemplary embodiment, a case where the authentication information is a device ID will be described.

Next, in step S602, the operator PC 102 causes the display I/F 228 to display a screen for receiving an input of an ID (device ID) of a support target device (supported device), and receives an input via the keyboard I/F 227.

Next, in step S603, the operator PC 102 determines whether a device ID (identification information) that indicates that a support target device (supported device) is a specific device was input, or nothing was input in step S602. This makes it possible to, as described above, address both of the case of responding to support requests from an unspecified large number of devices, like a call center, for example and the case of responding to a support request from a specific user or device.

In step S603, for example, when a device ID is input and an operation for confirming the input is carried out on the screen for receiving input of a device ID, the operator PC 102 determines that a device ID that indicates that a support target device (supported device) is a specific device is input. The number of device IDs received may be one or more. In other words, the operator PC 102 can designate a plurality of supported devices as support target devices (supported devices). On the other hand, when no device ID is input and an operation for confirming the input is carried out on the screen for receiving input of a device ID, the operator PC 102 determines that nothing is input on the screen for receiving input of a device ID.

In step S603, if it is determined that nothing is input on the screen for receiving input of a device ID (NO in step S603), the processing skips step S604 and proceeds to step S605. On the other hand, if a device ID is input on the screen for receiving input of a device ID (YES in step S603), the processing proceeds to step S604.

In step S604, the operator PC 102 transmits the device ID of the support target device (supported device) input in step S602 to the HTTP relay server 103. Then, the processing proceeds to step S605.

In step S605, the operator PC 102 receives a URI used for exchanging support data, from the HTTP relay server 103.

Next, in step S606, the operator PC 102 performs actual remote support by executing transmission (POST) or reception (GET) of support data with respect to the URI received in step S605. When the transmission/reception of support data ends, then in step S607, the operator PC 102 transmits information that indicates the end of support, to the HTTP relay server 103. Then, the processing according to the flowchart illustrated in FIG. 6 ends.

Figure 7:
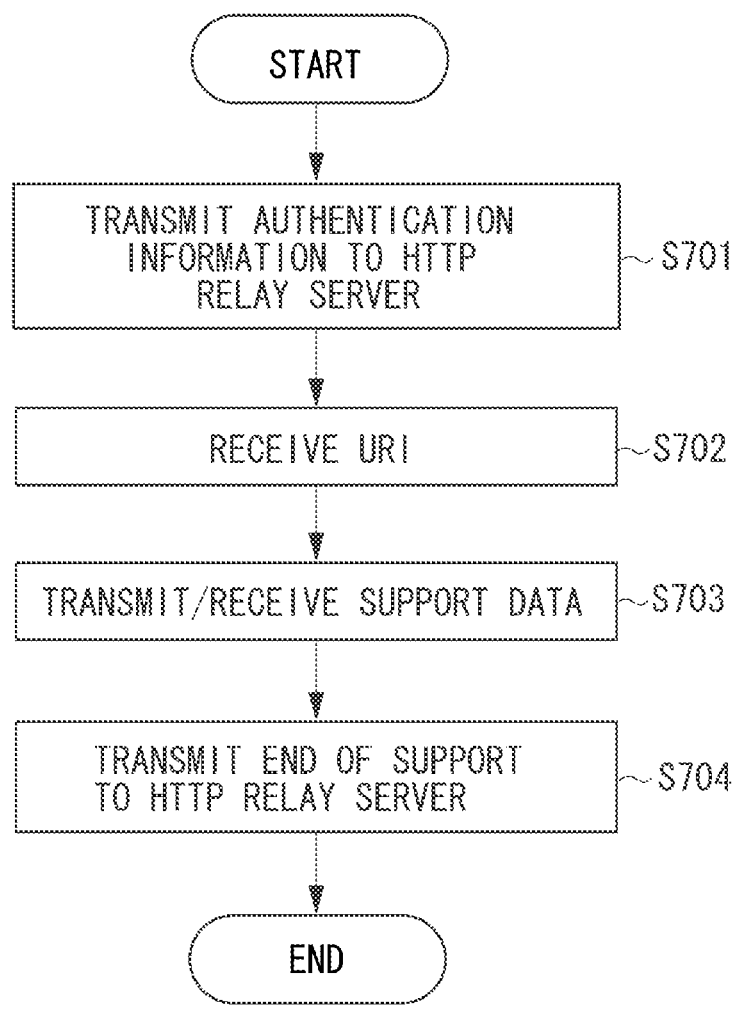
FIG. 7 is a flowchart illustrating processing performed by an image forming apparatus.

FIG. 7 is a flowchart illustrating an example of processing performed by the image forming apparatus 101 when communication with the HTTP relay server 103 is performed. The flowchart illustrated in FIG. 7 is achieved when the CPU 202 reads out a program stored in the HDD 205 into the RAM 204 and executes the read program.

First, in step S701, the image forming apparatus 101 transmits authentication information to the HTTP relay server 103.

Next, in step S702, the image forming apparatus 101 receives a URI used for exchanging support data, from the HTTP relay server 103.

Next, in step S703, the image forming apparatus 101 executes transmission (POST) or reception (GET) of support data with respect to the URI received in step S702 so as to receive remote support from the operator PC 102. When the transmission/reception of the support data ends, then in step S704, the image forming apparatus 101 transmits information indicating that the support ends, to the HTTP relay server 103. Then, the processing according to the flowchart illustrated in FIG. 7 ends.

As described above, according to the present exemplary embodiment, the HTTP relay server 103 determines whether the communication partner device is a supporting device or a supported device, using the device management table illustrated in FIG. 4. Further, the HTTP relay server 103 determines the state ("used" or "unused") of the URI indicating an area where the support data is temporarily stored, and devices using the URI (device IDs), according to the URI management table illustrated in FIG. 5. When the image forming apparatus 101 makes access (request for communication), this image forming apparatus 101 is assigned to an unused URI. Further, when the operator PC 102 makes access (request for communication), the operator PC 102 is assigned to a URI that the supported device is using. In this way, the image forming apparatus 101 or the operator PC 102 makes access to the HTTP relay server 103 first, and thereafter, the HTTP relay server 103 automatically assigns a communication area thereto. Therefore, an operation is unnecessary from when the image forming apparatus 101 or the operator PC 102 makes access to the HTTP relay server 103 until the remote support starts. This allows an operation when the image forming apparatus 101 and the operator PC 102 starts communication for remote support via the HTTP relay server 103 to be performed easily. This makes it possible to start remote support more accurately and more speedily.

According to the present exemplary embodiment, the operator PC 102 is assigned to a URI that is used by a supported device (image forming apparatus 101) in the URI management table. On the other hand, the image forming apparatus 101 is assigned to an unused URI in the URI management table. However, the processing does not necessarily have to be performed in this way. For example, contrary to the processing in the present exemplary embodiment, the operator PC 102 may be assigned to an unused URI according to the URI management table, and the image forming apparatus 101 may be assigned to a URI to which only the operator PC 102 is assigned according to the URI management table. Further, in a case where the operator PC 102 is also assigned to all of URIs to which the image forming apparatus 101 is assigned, and the operator PC 102 may be assigned to an unused URI according to the URI management table. In this case, the configuration is such that the operator PC is assigned to both of a used URI and an unused URI.

Further, according to the present exemplary embodiment, in the URI management table, the maximum number of supporting devices (operator PC 102) assigned to a single URI is one, and the maximum number of supported devices (image forming apparatuses 101) assigned to a single URI is one as well. However, in a case where a plurality of operator PCs 102 jointly perform remote support for one image forming apparatus 101 according to the URI management table, the maximum number of supporting devices simultaneous assigned to one URI may be set to 2 or more. In other words, a plurality of specific operator PCs 102 that jointly perform remote support for one image forming apparatus 101 are assigned to one URI together, and regarding operator PCs other than the specific operator PCs 102, one operator PC 102 is assigned to one URI. All of the operator PCs 102 may be specific operator PCs that perform remote support for the image forming apparatus 101. Further, in this case, the image forming apparatus 101 can transmit support data to a single URI, and the operator PCs 102 can receive support data from the URI (the single URI). Further, in this case, for example, between step S306 and step S308 illustrated in FIG. 3, the HTTP relay server 103 performs the following processing. Specifically, the HTTP relay server 103 searches for a URI in which a supporting device that performs remote support, together with the supporting device making access, are included in the devices using the URI. If there is such a URI, the HTTP relay server 103 assigns the supporting device making access to this URI. On the other hand, if there is not such a URI, the processing proceeds to step S308. In this way, in a case where an ID (device ID) of a supported device as a support target is not received from the supporting device, the URI to which the supporting device is assigned is not limited to such a URI in which only supported devices are included in the devices using the URI. In other words, the configuration may be such that a supporting device is assigned to a URI to which a supported device to which remote support can be provided is assigned.

Further, in a case where it is preliminarily obvious that a plurality of image forming apparatuses 101 need to receive remote support having similar contents, for example, when a large number of image forming apparatuses 101 are introduced into an office, the image forming apparatuses 101 may be assigned to a single URI together. In other words, a plurality of image forming apparatuses 101 that are to receive the same remote support may be assigned to a single URI together.

Further, in the present exemplary embodiment, an example is described where the URI management table stores URIs, states thereof, and devices using the URIs in a mutually associated state. However, the processing does not have to be performed in this way. For example, if there is no device using a URI, the state thereof may be set to be "unused", and the URI management table may not store a state.

Further, the supported device is not limited to the image forming apparatus 101 (MFP) illustrated in FIG. 2, and it may be, for example, an image forming apparatus such as a printer or a scanner.

Next, a second exemplary embodiment of the present invention will be described. In the first exemplary embodiment, an example case where one operator PC 102 performs remote support is described. On the other hand, in the present exemplary embodiment, an example case is described where a plurality of operator PCs jointly performs remote support. Thus, the present exemplary embodiment is different from the first exemplary embodiment mainly in that operator PCs for performing remote support are added, which also makes the processing thereof different. Therefore, in the description of the present exemplary embodiment, parts in the present exemplary embodiment that are identical to those in the first exemplary embodiment are denoted by the same reference numerals as those indicated in FIGS. 1 to 7, and detailed descriptions thereof are omitted.

Figure 8:
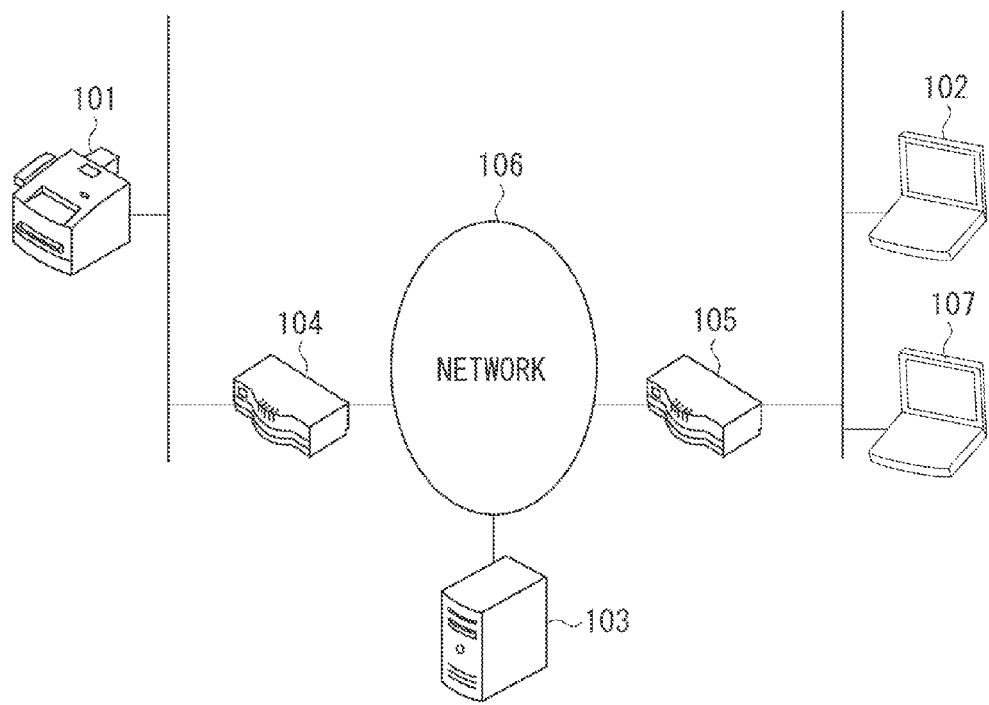
FIG. 8 illustrates a network configuration of a remote support system according to a second exemplary embodiment of the present invention.

FIG. 8 illustrates an example network configuration of a remote support system according to the present exemplary embodiment.

An image forming apparatus 101, an operator PC 102, and an HTTP relay server 103 are identical to those in the first exemplary embodiment, and therefore, detailed descriptions thereof are omitted. In the present exemplary embodiment, in addition to the image forming apparatus 101, the operator PC 102, and the HTTP relay server 103, an operator PC 107 is connected inside a fire wall (FW) 105.

Hardware configurations of the image forming apparatus 101, the operator PC 102, and the HTTP relay server 103 are similar to those of the first exemplary embodiment. Therefore, detailed descriptions of the hardware configurations of the image forming apparatus 101, the operator PC 102, and the HTTP relay server 103 are omitted.

Figure 9:
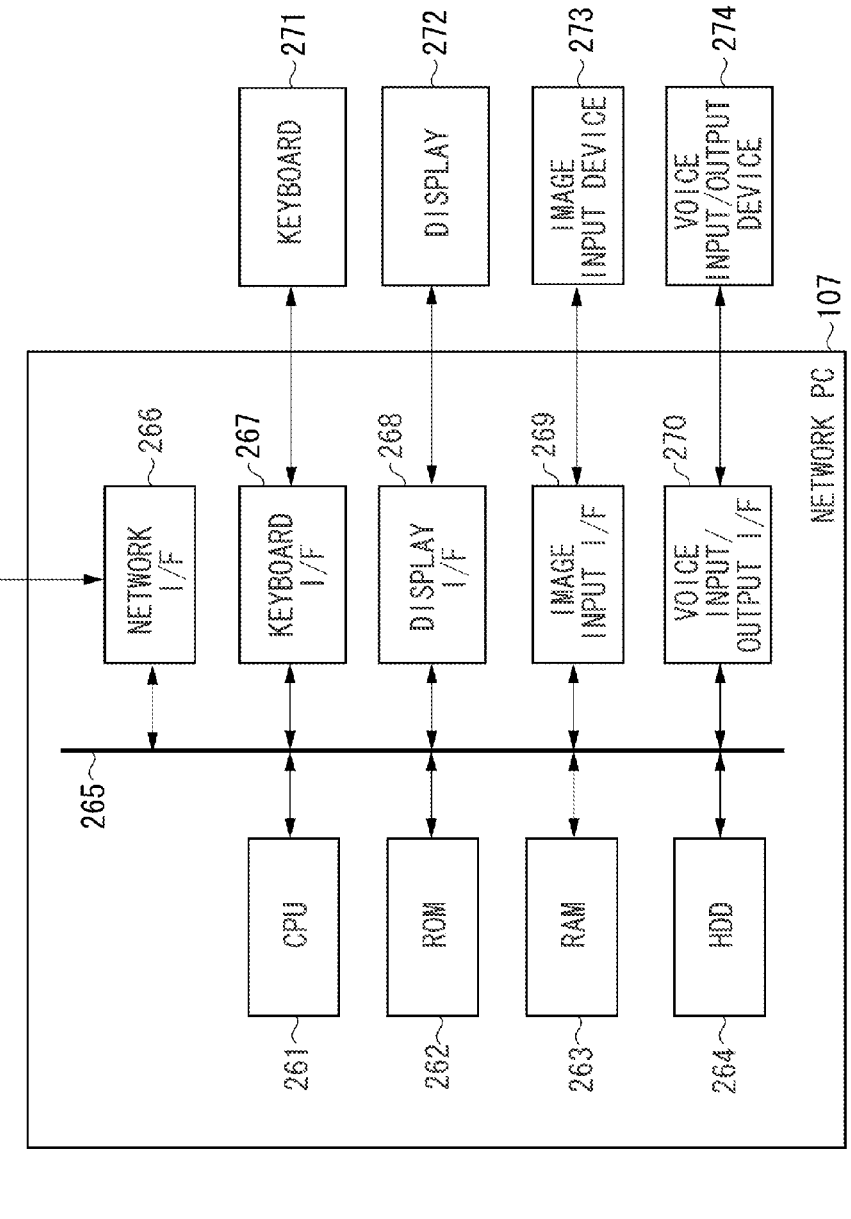
FIG. 9 illustrates a hardware configuration of an operator PC.

FIG. 9 is a block diagram illustrating an example of a hardware configuration of the operator PC 107.

The operator PC 107 includes a CPU 261, a ROM 262, a RAM 263, a HDD 264, a system bus 265, a network I/F 266, a keyboard I/F 267, a display I/F 268, an image input I/F 269, and a voice input I/F 270. To the keyboard I/F 267, a keyboard 271 is connected. To the display I/F 268, a display 272 is connected. To the image input I/F 269, an image input device 273 is connected. To the voice input I/F 270, a voice input/output device 274 is connected. As control methods for the units illustrated in FIG. 9 are similar to those of the operator PC 102, detailed descriptions thereof are omitted.

Figure 10B:
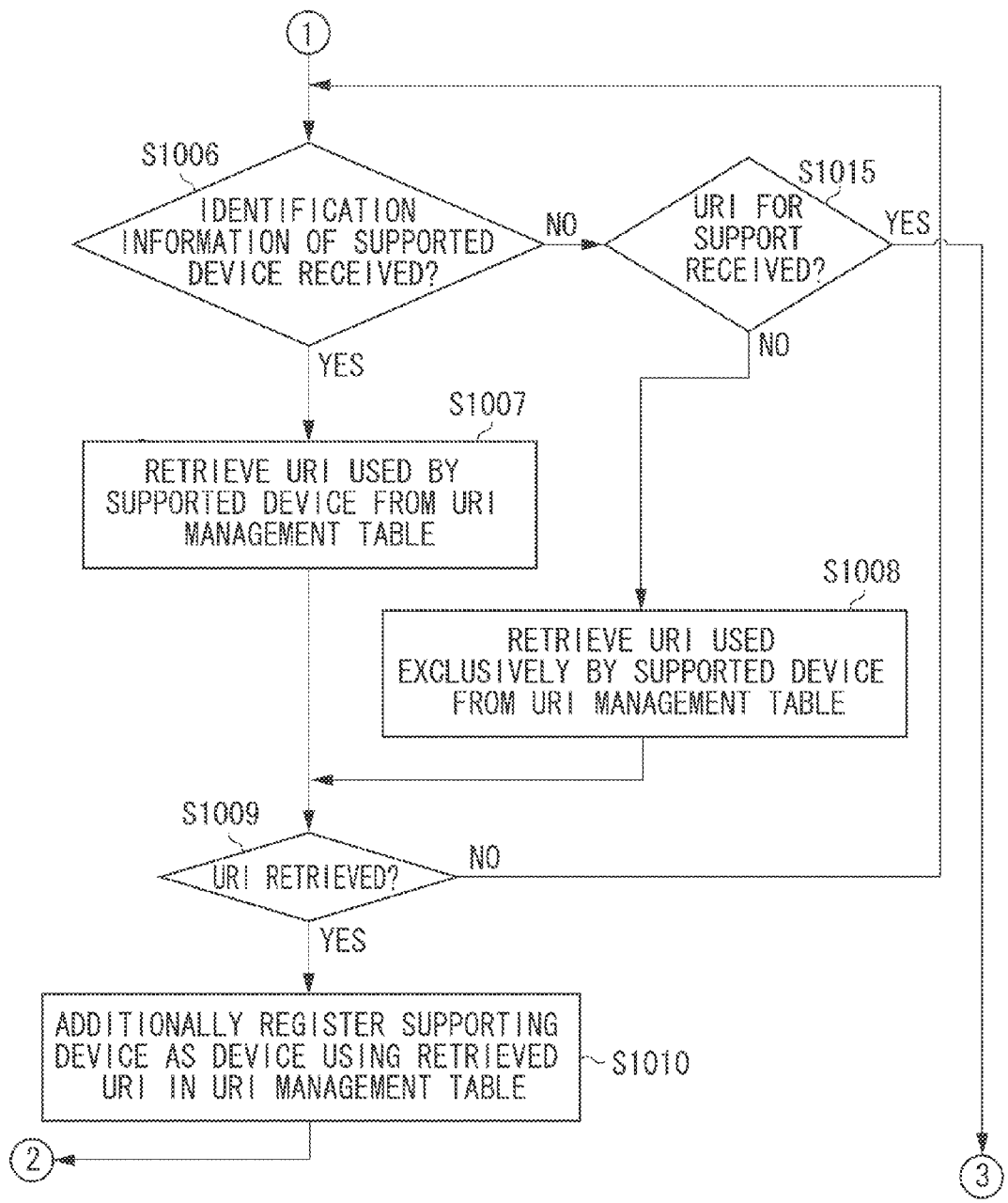
FIG. 10 (consisting of FIGS. 10A and 10B) is a flowchart illustrating processing performed by the HTTP relay server according to the second exemplary embodiment of the present invention.

FIG. 10 (consisting of FIGS. 10A and 10B) is a flowchart illustrating an example of processing performed by the HTTP relay server 103 when communication is performed with the image forming apparatus 101 and the operator PCs 102, 107. The flowchart illustrated in FIG. 10 is achieved when, for example, the CPU 241 reads out a program stored in the HDD 244 into the RAM 243 and executes the same.

As processing in steps S1001 to S1014 illustrated in FIG. 10 are similar to the processing in steps S301 to S314 illustrated in FIG. 3, respectively, detailed descriptions of the processing in steps S1001 to S1014 illustrated in FIG. 10 are omitted.

In step S1006 illustrated in FIG. 10, if it is determined that no ID of a support target device (supported device) is received (NO in step S1006), the processing proceeds to step S1015. In step S1015, the HTTP relay server 103 determines whether a URI for support is received from the communication partner (the operator PC 107). As described above, in step S1203, the operator PC 107 transmits a URI for support, thereby directly designating a URI to be used. If a URI for support is not received from the communication partner (operator PC 107) (NO in step S1015), the processing proceeds to step S1008. On the other hand, if a URI for support is received from the communication partner (operator PC 107) (YES in step S1015), the processing proceeds to step S1012.

Figure 11:
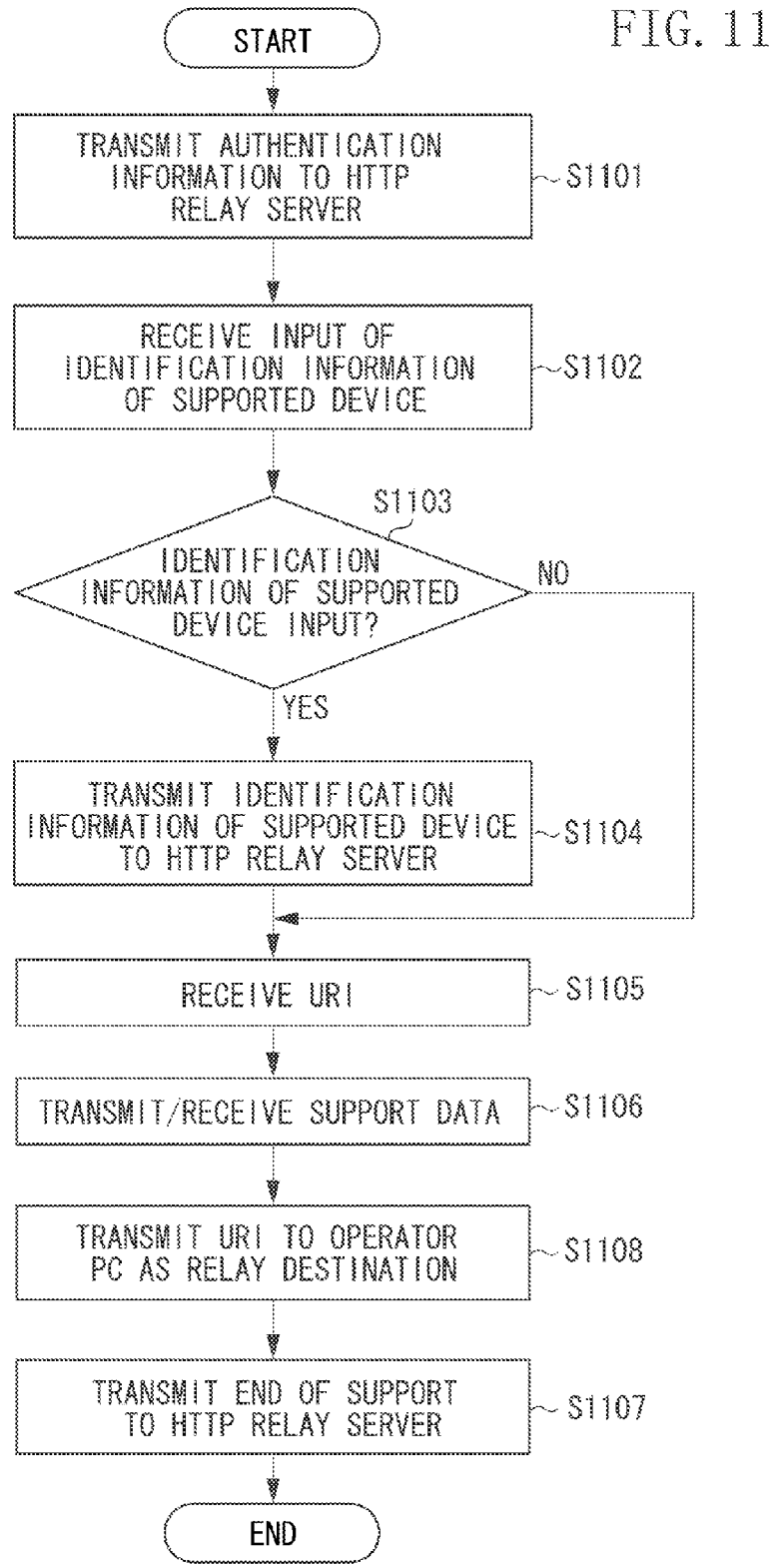
FIG. 11 is a flowchart illustrating processing performed by the operator PC according to the second exemplary embodiment of the present invention.

FIG. 11 is a flowchart illustrating an example of processing executed by the operator PC 102 when communication is performed with the HTTP relay server 103 and the operator PC 107. The flowchart illustrated in FIG. 11 is achieved when, for example, the CPU 221 reads out a program stored in the HDD 224 into the RAM 223 and executes the read program.

As the processing performed in steps S1101 to S1107 illustrated in FIG. 11 is similar to the processing performed in steps S601 to S607 illustrated in FIG. 6, detailed descriptions of the processing in steps S1101 to S1107 illustrated in FIG. 11 are omitted.

In step S1106 illustrated in FIG. 11, when the transmission/reception of the support data ends, then in step S1108, the operator PC 102 transmits the URI used by the operator PC 102 to a device (operator PC 107) that takes over the remote support. Thereafter, the processing proceeds to step S1107, and the processing according to the flowchart of FIG. 11 ends.

FIG. 12 is a flowchart illustrating an example of processing performed by the operator PC 107 when communication is performed with the HTTP relay server 103 and the operator PC 102. The flowchart illustrated in FIG. 12 is achieved when, for example, the CPU 261 reads out a program stored in the HDD 264 into the RAM 263 and executes the read program.

First, in step S1201, the operator PC 107 transmits authentication information to the HTTP relay server 103. As described in the description of the first exemplary embodiment, the authentication information may be a device ID, or may be other information (e.g., a user ID). In the present exemplary embodiment, a case is described where the authentication information is a device ID.

Next, in step S1202, the operator PC 107 receives a URI from a supporting device (the operator PC 102) from which the operator PC 107 takes over the support.

Next, in step S1203, the operator PC 107 transmits the URI received in step S1202, as a URI for support, to the HTTP relay server 103. This processing in step S1203 and the processing in step S1015 illustrated in FIG. 10 makes it possible to eliminate work by an operator when the device that executes remote support to the image forming apparatus 101 is changed from the operator PC 102 to the operator PC 107.

Next, in step S1204, the operator PC 107 performs actual remote support by executing transmission (POST) or reception (GET) of support data with respect to the URI received in step S1202. When the transmission/reception of support data ends, then in step S1205, the operator PC 107 transmits information that indicates the end of support, to the HTTP relay server 103. Then, the processing according to the flowchart illustrated in FIG. 12 ends.

As an example of the processing performed by the image forming apparatus 101 can be achieved by the processing performed according to the flowchart illustrated in FIG. 7, detailed description of the processing performed by the image forming apparatus 101 is omitted herein.

As described above, in the present exemplary embodiment, the operator PC 102 transmits the URI used in executing remote support, to the operator PC 107, and the operator PC 107 transmits the URI to the HTTP relay server 103 when the operator PC 107 takes over the remote support. Upon receiving the URI, the HTTP relay server 103 transmits/receives support data without updating the URI management table. Therefore, even in a case where a plurality of operator PCs 102 and 107 jointly execute remote support, an operation is unnecessary from when the image forming apparatus 101, the operator PCs 102 and 107 make accesses to the HTTP relay server 103 until the remote support starts. This allows an operation when the image forming apparatus 101 and the operator PCs 102 and 107 start communication for remote support via the HTTP relay server 103 to be performed easily. This makes it possible to start remote support more accurately and more speedily.

In the present exemplary embodiment as well, various types of modifications described in the description of the first exemplary embodiment can be applied.

As described above, according to each exemplary embodiment, an operation when a supporting device and a supported device start communication for remote support via a relay server can be performed easily.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248206 filed Nov. 29, 2013, which is hereby incorporated by reference herein in its entirety.

What is claimed is:

1. An information processing apparatus executed by a computer which includes a storage unit and a processing unit and which implements a registration unit, a notification unit, and a relay unit, the information processing apparatus configured to relay data via a network between a supporting device and a supported device that receives remote support by the supporting device, the information processing apparatus comprising:
    the storage unit;
    the processing unit configured to store in the storage unit a plurality of relay identifiers, each for transmitting and receiving data between a supporting device and a supported device, in such a manner that a relay identifier included in the plurality of relay identifiers is associated with a supporting device or a supported device that is using the relay identifier;
    the registration unit configured to select, according to a request from a first supported device, a first relay identifier not being used by another supported device from among the stored plurality of relay identifiers and then register the first supported device in association with the first relay identifier, and to register, according to a request from a first supporting device for providing remote support to the first supported device, the first supporting device in association with the first relay identifier;
    the notification unit configured to notify the first supported device and the first supporting device about the first relay identifier; and
    the relay unit configured to buffer data according to receiving, from the first supported device or the first supporting device, a POST request to post the data based on the first relay identifier, and to return the buffered data according to receiving, from the first supporting device or the first supported device, a GET request to get the buffered data based on the first relay identifier.

2. The information processing apparatus according to claim 1, further comprising a first receiving unit implemented by the computer and configured to receive, from the supporting device, information for identifying the supported device to which the supporting device is to provide remote support, wherein in a case where the first receiving unit receives, from the first supporting device, information for identifying the first supported device, the registration unit selects the first relay identifier being used by the first supported device from among the stored plurality of URIs, and then registers the first supporting device in association with the first relay identifier.

3. The information processing apparatus according to claim 2,
wherein in a case where the first receiving unit does not receive, from the first supporting device, the information for identifying the first supported device, the registration unit selects a URI registered in association with a supported device and not in association with a supporting device from among the stored plurality of URIs, and then registers the first supporting device in association with the selected URI.

4. The information processing apparatus according to claim 1, further comprising a determination unit implemented by the computer and configured to determine whether a relay identifier to be registered in association with the first supporting device has been retrieved,
wherein the registration unit waits until the determination unit determines that the URI has been retrieved, and then registers the first supporting device in association with retrieved relay identifier.

5. The information processing apparatus according to claim 1, further comprising a second receiving unit implemented by the computer and configured to receive, from the supporting device, a relay identifier being used by the another supporting device,
wherein in a case where the second receiving unit receives the relay identifier being used by the another supporting device, the registration unit does not perform the registration for the supporting device that has transmitted the relay identifier.

6. The information processing apparatus according to claim 1, wherein the relay identifier is uniform resource identifiers (URI).

7. A remote support system comprising:
a first supporting device;
a first supported device that receives remote support from the first supporting device; and
a relay device configured to relay data between the first supporting device and the first supported device via a network,
wherein the relay device is executed by a computer which includes a storage unit and a processing unit and which implements a registration unit, a notification unit, and a relay unit, the relay device includes:
the storage device;
the processing unit configured to star in the storage device a plurality of relay identifier, each for transmitting and receiving data between a supporting device and a supported device, in such a manner that relay identifier included in plurality of relay identifiers is associated wish a supporting device or a supported device that is using the relay identifier;
the registration unit configured to select, according to a request from the first supported device, a first relay identifier not being used by another supported device from among the stored plurality of relay identifiers and then register the first supported device in association with the first relay identifier, and to register, according to a request from the first supporting device, the first supporting device in association with the first relay identifier, the notification unit configured to notify the first supported device and the first supporting device about the first relay identifier; and
the relay unit configured to buffer data according to receiving, from the first supported device or the first supporting device, a POST request so post the data based on the first relay identifier, and to return the buffered data according to receiving, from the first supporting device or the first supported device, a GET request to get the buffered data based on the first relay identifier, and
wherein the first supporting device and the first supported device each include:
a receiving unit configured to receive the first relay identifier from the relay unit;
a first transmission unit configured to transmit, to the relay device, the POST request to post data based on the first relay identifier; and
a second transmission unit configured to transmit, to the relay system, the GET request to get data based on the first relay identifier.

8. The remote support system according to claim 7,
wherein the supported device is an image forming apparatus.

9. The remote support system according to claim 7,
wherein a firewall is arranged between the supporting device and the network, and between the supported device and the network.

10. The remote support system according to claim 7, wherein the relay identifier is uniform resource identifiers (URI).

11. A method for controlling an information processing apparatus for relaying data via network between a supporting device and a supported device that receives remote support by the supporting device, information processing apparatus executed by a computer which includes a storage unit and a processing unit and which implements a registration unit, a notification unit, and a relay unit, the method comprising:
using the processing unit to store in the storage unit a plurality of relay identifier, each for transmitting and receiving data between a supporting device and a supported device, in such a manner that a relay identifier included in the plurality of relay identifier is associated with a supporting device or a supported device that is using the relay identifier
using the registration unit to select, according to a request from a first supported device, a first relay identifier not being used by another supported device from among the stored plurality of relay identifiers and then register the first supported device in association with the first relay identifier, and to register, according to a request from a first supporting device for providing remote support to the first supported device, the first supporting device in association with the first relay identifier;
using the notification unit to notify the first supported device and the first supporting device about the first relay identifier; and
using the notification unit to notify the first supported device and the first supporting device about the first relay identifier, and
using the buffering unit to buffer data according to receiving, from the first supported device or the first supporting device, a POST request to post the data based on the first relay identifier, and to return the buffered data according to receiving, from the first supporting device or the first supported device, a GET request to get the buffered data based on the relay identifier.

12. The method according to claim 11, wherein the relay identifier is uniform resource identifiers (URI).

13. A non-transitory computer readable storage medium for storing a program that causes a computer to execute a method for controlling an information processing apparatus, information processing apparatus executed by the computer which includes a storage unit and a processing unit and which implements a registration unit, a notification unit, and a relay unit, the comprising:

using the unit to store in the storage unit a plurality of relay identifier, each for transmitting and receiving data between a supporting device and a supported device, in such a manner that a URI included in the plurality of relay identifies is associated with a supporting device or a supported device that is using the relay identifier;

using the registration unit to select, according to a request from a first supported device, a first relay identifier not being used by another supported device from among the stored plurality of relay identifiers and then register the first supported device in association with the first relay identifier, and to register, according to a request from a first supporting device for providing remote support to the first supported device, the first supporting device in association with the first relay identifier;

using the notification unit to notify the first supported device and the first supporting device about the first relay identifier; and using the buffering unit data according to receiving, from the first supported device or the first supporting device, a POST request to post the data based on the first relay identifier, and to return the buffered data according to receiving, from the first supporting device or the first supported device, a GET request to get the buffered data based on the first relay identifier.

14. The non-transitory computer readable storage medium according to claim 12, wherein the relay identifier is unform resource identifiers (URI).

* * * * *